United States Patent
Wang et al.

(10) Patent No.: US 9,453,087 B2
(45) Date of Patent: Sep. 27, 2016

(54) METHOD FOR SYNTHESIZING HOMOPOLYMER N-VINYL BUTYROLACTAM WITH SUPER-LOW MOLECULAR WEIGHT AND SUPER-LOW RESIDUAL MONOMER

(75) Inventors: Yu Wang, Shanghai (CN); Wei Liu, Shanghai (CN); Zhan Chen, Shanghai (CN)

(73) Assignee: SHANGHAI YUKING WATER SOLUBLE MATERIAL TECHNOLOGY CO., LTD., Shanghai (CN)

( * ) Notice: Subject to any disclaimer, the term of this patent is extended or adjusted under 35 U.S.C. 154(b) by 101 days.

(21) Appl. No.: 14/401,743

(22) PCT Filed: Jul. 23, 2012

(86) PCT No.: PCT/CN2012/079057
§ 371 (c)(1),
(2), (4) Date: Nov. 17, 2014

(87) PCT Pub. No.: WO2013/170533
PCT Pub. Date: Nov. 21, 2013

(65) Prior Publication Data
US 2015/0141600 A1   May 21, 2015

(30) Foreign Application Priority Data
May 16, 2012  (CN) .......................... 2012 1 0154939

(51) Int. Cl.
C08F 24/00 (2006.01)
C08F 126/06 (2006.01)
C08F 4/38 (2006.01)
C08F 6/00 (2006.01)

(52) U.S. Cl.
CPC ................. *C08F 24/00* (2013.01); *C08F 4/38* (2013.01); *C08F 6/003* (2013.01); *C08F 126/06* (2013.01)

(58) Field of Classification Search
CPC ........ C08F 126/06; C08F 24/00; C08F 4/38; C08F 6/003
USPC .................................................. 526/258, 135
See application file for complete search history.

(56) References Cited

U.S. PATENT DOCUMENTS

| 5,130,388 A | 7/1992 | Shih |
| 6,187,884 B1 * | 2/2001 | Kothrade .............. C08F 126/10  526/211 |

FOREIGN PATENT DOCUMENTS

| CN | 101585893 A | 11/2009 |
| JP | 2007238774 A | 9/2007 |

* cited by examiner

*Primary Examiner* — Ling Choi
*Assistant Examiner* — Chun-Cheng Wang
(74) *Attorney, Agent, or Firm* — Avery N. Goldstein; Blue Filament Law LLC

(57) ABSTRACT

A synthesis method of ultra low molecular weight homopolymerized N-vinyl butyrolactam with ultra low residual monomer content is provided N-vinyl butyrolactam monomers and water are provided with the mass ratio of 3:17~8:12 0.5%~5.0% by weight of initiators, 0.1%~5.0% by weight of a catalyst, and 0.1%~10% by weight of a molecular weight regulator are provided in the presence of an inert gas, adding the above mentioned raw materials in batches, adjusting the pH of the reaction system to 7.0-8.0 with an activator, reacting at the polymerization temperature of 60-85° C. A peroxide is added and maintaining the temperature for 2 hours, to obtain an aqueous solution of ultra low molecular weight homopolymerized N-vinyl butyrolactam. The aqueous solution is dried to obtain a powdery ultra low molecular weight homopolymerized N-vinyl butyrolactam with ultra low residual monomer content.

7 Claims, No Drawings

METHOD FOR SYNTHESIZING HOMOPOLYMER N-VINYL BUTYROLACTAM WITH SUPER-LOW MOLECULAR WEIGHT AND SUPER-LOW RESIDUAL MONOMER

FIELD OF TECHNOLOGY

The present invention relates to the technical field of synthesizing chemical compounds, especially to the technical field of synthesizing homopolymerized N-vinyl butyrolactam, in particular to a synthesis method of ultra low molecular weight homopolymerized N-vinyl butyrolactam with ultra low residual monomer content.

DESCRIPTION OF RELATED ARTS

Ultra low molecular weight homopolymerized N-vinyl butyrolactam refers to homopolymerized N-vinyl butyrolactam whose weight average molecular weight is below 15000 and whose K value is 10-17. It is polymerized from N-vinyl butyrolactam under certain conditions (Cui Yingde, Yi Guobin, Liao Liewen, Synthesis and application of polyvinylpyrrolidone[M]. Science Press, 2001, 2:150), ultra low molecular weight homopolymerized N-vinyl butyrolactam is often used as dispersing agents and cosolvents of pharmaceutical liquid preparations for its molecular weight is small and conducive to metabolism. An injection added a certain concentration of homopolymerized N-vinyl butyrolactam can greatly improve the dispersion and the dissolution of drugs such as penicillin, procaine and insulin, and make them release slowly in human bodies and extend their efficacies.

Homopolymerized N-vinyl butyrolactam has been used increasingly due to its unique properties, and it not only has an excellent solubility, an excellent chemical stability, an excellent film forming ability, an excellent physiological inert, an excellent adhesive power and an excellent protective glue effect, but also can be combined with many inorganic or organic compounds, therefore, since homopolymerized N-vinyl butyrolactam was available, it has been widely used in medicines, cosmetics, foods, brewing, coatings, adhesives, dyeing and printing auxiliaries, separation membranes, photographic materials and other fields (Yan Ruixuan. Water-soluble polymers, 2nd ed. [M] Beijing: Chemical industry Press, 2010, 215-220). Wherein small molecular weight homopolymerized N-vinyl butyrolactam is mainly used in eye medicines and injections of medicines.

Currently the industrial synthesis method of homopolymerized N-vinyl butyrolactam generally adopts the solution polymerization method, and the solvents used for the solution polymerization are mainly water, ethanol, isopropanol, methanol and so on. Through the research results of Zhang Guanghua et. al., it is found that: in the solution polymerization method, different solvents have different effects on the molecular weight of the polymerization product homopolymerized N-vinyl butyrolactam, and in a common solvent, a high molecular weight homopolymerized N-vinyl butyrolactam product is relatively easily polymerized, while a relatively low molecular weight homopolymerized N-vinyl butyrolactam product such as the homopolymerized N-vinyl butyrolactam with the molecular weight of 2000-15000 is very difficultly polymerized. The main reasons are that the polymerization of N-vinyl butyrolactam belongs to a chain reaction which, once started, is difficult to stop, therefore the molecular weight is difficult to control; at the same time, even a relatively low molecular weight homopolymerized N-vinyl butyrolactam product is synthesized, the residual monomer content in its slurry is still very high, thus it is difficult to meet the requirements of its applications in medicines, daily cosmetics and other fields.

According to the regulations of the United States Pharmacopoeia USP32, the content requirement of the residual N-vinyl butyrolactam monomers of pharmaceutical or food grade homopolymerized N-vinyl butyrolactam is less than 10 ppm, at present, the industrial production of the homopolymerized N-vinyl butyrolactam mostly adopts postproessing to polymerized materials, such as activated carbon adsorption, solvent extraction or ultrafiltration, radiation (Nuber, Dr. Adolf, Sanner, Dr. Axel, Urban, Dr. Dieter. Use of an adsorbent for the removal of vinylpyrrolidon from vinylpyrrolidon polymer solutions [P]. EP 0258854, 1991-3-13; Juergen Detering, Limburgerhof, Hartwig Voss, Frankenthal. Preparation of ultrapure N-vinylpyrrolidone polymers [P]. U.S. Pat. No. 5,354,945, 1994-10-11; Li Xinming. Method for eliminating residual N-vinylpyrrolidone monomers in a polymer [P]. CN 1712432, 2005-12-28.).

Therefore, if a method that can synthesize an ultra low molecular weight homopolymerized N-vinyl butyrolactam with ultra low residual monomer content can be developed by studying the effects of initiation systems, amounts of initiators, times, polymerization processes etc. on the final product in the synthesis process of homopolymerized N-vinyl butyrolactam, and the homopolymerized N-vinyl butyrolactam product whose molecular weight is 2000-15000, whose K value is 12-17 and whose residual monomer content is below 10 ppm can be synthesized by this method, it will have very important significances.

SUMMARY OF THE INVENTION

Aspects of the present invention generally pertain to a synthesis method of ultra low molecular weight homopolymerized N-vinyl butyrolactam with ultra low residual monomer content, which is designed skillfully and simple in preparation, the residual monomer content of the ultra low molecular weight homopolymerized N-vinyl butyrolactam with ultra low residual monomer content prepared is less than 10 ppm, and the K value is 12-17, therefore the present invention is suitable for large-scale popularization.

In order to realize the above aims, in a first aspect of the present invention, a synthesis method of ultra low molecular weight homopolymerized N-vinyl butyrolactam with ultra low residual monomer content is provided, and comprises:

Using N-vinyl butyrolactam monomers and water with the mass ratio of 3:17~8:12, then based on the N-vinyl butyrolactam monomers, using 0.5%~5.0% by weight of initiators, 0.1%~5.0% by weight of a catalyst, and 0.1%~10% by weight of a molecular weight regulator, wherein the initiators include 25% by weight of an initiator A, 67.5% by weight of an initiator B and 7.5% by weight of an initiator C;

In the presence of an inert gas, first adding 45% of the total weight of the water, 30% of the total weight of the N-vinyl butyrolactam monomers, the initiator A, 70% of the total weight of the catalyst and at least 70% of the total weight of the molecular weight regulator, adjusting the pH of the reaction system to 7.0-8.0 with an activator, reacting at the polymerization temperature of 60-85° C., adding the remaining water, the remaining N-vinyl butyrolactam monomers, the initiator B, the remaining catalyst and the remaining molecular weight regulator in batches during the initial 4-9 hours after the beginning of the reaction, adjusting the pH of the reaction system to 7.0-8.0 with the activator during this period, then adding the initiator C after keeping the temperature of 80-100° C. for 30 minutes, then adding a peroxide with 0.01%~1% of the total weight of the N-vinyl butyrolactam monomers after keeping the temperature for 1-3 hours, then further keeping the temperature for 2 hours, to obtain an aqueous solution of ultra low molecular weight homopolymerized N-vinyl butyrolactam, drying the aqueous solution to obtain a powdery ultra low molecular weight homopolymerized N-vinyl butyrolactam with ultra low residual monomer content, whose K value is 12-17, whose molecular weight is 2000-15000, and whose residual monomer content is less than 10 ppm.

The initiators can be composed of any suitable substances, more preferably, the initiators are selected from at least one of hydrogen peroxide, tert-butyl hydroperoxide, tert-amyl hydroperoxide, peroxydisulfuric acid and potassium peroxydisulfate.

The initiator A, the initiator B, the initiator C can be any suitable substances, preferably, the initiator A is a solution mixing hydrogen peroxide and tert-butyl hydroperoxide; the initiator B is tert-butyl hydroperoxide or a solution mixing hydrogen peroxide and tert-butyl hydroperoxide; the initiator C is tert-butyl hydroperoxide or a solution mixing hydrogen peroxide and tert-butyl hydroperoxide.

The catalyst may be any suitable catalyst, preferably, the catalyst is selected from at least one of ferrous sulfate aqueous solution, ferrous chloride aqueous solution and copper sulfate aqueous solution.

The molecular weight regulator may be any suitable chain transfer agent, preferably, the molecular weight regulator is selected from at least one of ethanol, n-propanol, isopropanol, dodecyl mercaptan and sulfite.

The activator may be any suitable activator, preferably, the activator is ammonia water, sodium hydroxide, triethanolamine, hydroxyl ammonium salt or sodium carbonate.

The peroxide can be any suitable peroxide, preferably, the peroxide is hydrogen peroxide or tert-butyl hydroperoxide.

The beneficial effects of the present invention are as follows: The synthesis method of ultra low molecular weight homopolymerized N-vinyl butyrolactam with ultra low residual monomer content of the present invention comprises: using N-vinyl butyrolactam monomers and water with the mass ratio of 3:17~8:12, then based on the N-vinyl butyrolactam monomers, using 0.5%~5.0% by weight of initiators, 0.1%~5.0% by weight of a catalyst, and 0.1%~10% by weight of a molecular weight regulator, wherein the initiators include 25% by weight of an initiator A, 67.5% by weight of an initiator B and 7.5% by weight of an initiator C; in the presence of an inert gas, first adding 45% of the total weight of the water and 30% of the total weight of the N-vinyl butyrolactam monomers, the initiator A, 70% of the total weight of the catalyst and at least 70% of the total weight of the molecular weight regulator, adjusting the pH of the reaction system to 7.0-8.0 with an activator, reacting at the polymerization temperature of 60-85° C., adding the remaining water, the remaining N-vinyl butyrolactam monomers, the initiator B, the remaining catalyst and the remaining molecular weight regulator in batches during the initial 4-9 hours after the beginning of the reaction, adjusting the pH of the reaction system to 7.0-8.0 with the activator during this period, then adding the initiator C after keeping the temperature of 80-100° C. for 30 minutes, then adding a peroxide with 0.01%~1% of the total weight of the N-vinyl butyrolactam monomers after keeping the temperature for 1-3 hours, then further keeping the temperature for 2 hours, to obtain an aqueous solution of ultra low molecular weight homopolymerized N-vinyl butyrolactam, drying the aqueous solution to obtain a powdery ultra low molecular weight homopolymerized N-vinyl butyrolactam with ultra low residual monomer content, whose K value is 12-17, whose molecular weight is 2000-15000, and whose residual monomer content is less than 10 ppm, so the present invention is designed skillfully and simple in preparation, the residual monomer content of the ultra low molecular weight homopolymerized N-vinyl butyrolactam with ultra low residual monomer content prepared is less than 10 ppm, and the K value is 12-17, therefore the present invention is suitable for large-scale popularization.

DETAILED DESCRIPTION OF THE PREFERRED EMBODIMENT

In order to understand the technical content of the present invention clearly, the present invention is further exemplified by reference to the following examples.

1.1 Experimental Raw Materials

TABLE 1

| Main raw materials | | |
|---|---|---|
| Name | Specification | Place of origin |
| N-vinyl butyrolactam | industrial grade (vacuum distillation) | Shanghai Yu King Chemical Technology Development Co., Ltd. |
| azobisisobutyronitrile (AIBN) | chemical pure | Shanghai No. 4 Reagent & H.V. Chemical Co., Ltd. |
| sodium carbonate | analytical pure | Sinopharm Chemical Reagent Co., Ltd. |
| hydrogen peroxide | (30%) chemical pure | Sinopharm Chemical Reagent Co., Ltd. |
| ammonia water | (25%) chemical pure | Sinopharm Chemical Reagent Co., Ltd. |
| tert-butyl hydroperoxide | chemical pure | Sinopharm Chemical Reagent Co., Ltd. |
| distilled water | made by the applicant | |
| ammonium persulfate | analytical pure | Sinopharm Chemical Reagent Co., Ltd. |
| sodium bisulphite | chemical pure | Sinopharm Chemical Reagent Co., Ltd. |
| triethanolamine | chemical pure | Sinopharm Chemical Reagent Co., Ltd. |
| nitrogen gas | 99% | Shanghai Hukang Industrial Gas Co., Ltd. |

1.2 Experimental Instruments

A 2XZ-2-type rotary vane vacuum pump, a RE52CS rotary evaporator, a 250 ml three-necked flask, a HH-WO thermostatic oil bath, a ubbelohde viscometer (Φ0.5=0.5 mm), a 100° C. thermometer, a 5312 electric mixer, a syringe, a FA2004 analytical balance, a dropping funnel, a condenser, a conical flask, 10 ml pipettes, Alkali burettes.

1.3 Polymerization

Note: In the following contents, unless otherwise stated, the "part by weight" is only expressed as "part", the "weight %" is only expressed as "%".

Material preparation: the mass ratio of the N-vinyl butyrolactam monomers and the water is 3:17~8:12, the initiators are 0.5%~5.0% (based on the N-vinyl butyrolactam monomers), the catalyst is 0.1%~5.0% (based on the N-vinyl butyrolactam monomers), a small amount of the activator is used to adjust the pH of the reaction system, the molecular weight regulator is 0.1%~10% (based on the N-vinyl butyrolactam monomers); wherein the initiators can be at least one of hydrogen peroxide, tert-butyl hydroperoxide, tert-amyl hydroperoxide, peroxydisulfuric acid and potassium peroxydisulfate; the activator can be ammonia water, sodium hydroxide, triethanolamine, hydroxyl ammonium salt, sodium carbonate or the like; the catalyst can be aqueous solution with low concentration of at least one metal sulphate of ferrous sulfate, ferrous chloride and copper sulfate; the molecular weight regulator can be at least one of ethanol, n-propanol, isopropanol, dodecyl mercaptan, sulfite and so on.

Operation steps: in a three-necked flask equipped with a reflux condenser and a stirrer, first adding 45% of the total weight of the water, adding 30% of the total weight of the N-vinyl butyrolactam monomers, the initiatos A accounting for 25% of the total weight of the initiators, 70% of the total weight of the catalyst and at least 70% of the total weight of the molecular weight regulator while introducing $N_2$ and stirring, adjusting the pH of the solution to 7.0-8.0 with a suitable amount of the activator, increasing the temperature through an oil bath to 60-85° C., adding the remaining monomers, the initiator B accounting for 67.5% of the total weight of the initiators, the remaining catalyst, the remaining molecular weight regulator and the remaining water at several times during the initial 4-9 hours after the beginning of the reaction, adjusting the pH of the solution to 7.0-8.0 with the activator during this period, then adding the initiator C accounting for 7.5% of the total weight of the initiators after keeping the temperature of 80-100° C. for 30 minutes, then adding 0.01%~1% (based on the N-vinyl butyrolactam) of the peroxide after keeping the temperature for 1-3 hours, then further keeping the temperature for 2 hours, to obtain an aqueous solution of ultra low molecular weight homopolymerized N-vinyl butyrolactam, drying the aqueous solution to obtain a powdery ultra low molecular weight homopolymerized N-vinyl butyrolactam with ultra low residual monomer content, whose K value is 12-17, whose weight average molecular weight is 2000-15000, and whose residual monomer content is less than 10 ppm.

1.4 Measurements of Molecular Weight and Residual Monomer Content 1.4.1 Measurement of Molecular Weight Waters 515 gel chromatography and Waters 2410 differential refractive index detector are selected for the weight average molecular weight measurement; columns: two columns of Waters Ultrahydrogel 500he and Ultrahydrogel 120 are connected in series (7.8×300 mm); the mobile phase: 0.1M nitrate solution; the flow rate: 0.8 ml/min; the injection volume: 50 µl; the column temperature: 40° C.;

Usually we use the K value of the Fikentscher formula to characterize the molecular weight of homopolymerized N-vinyl butyrolactam, the K value is a parameter that is only related to the molecular weight and does not change as the concentration of homopolymerized N-vinyl butyrolactam changes. The commonly used method for measuring the K value is the viscosity method, wherein a ubbelohde viscometer measures the relative viscosity $\eta_r$ of the solution to water at a water bath temperature of 25±0.2° C.

The K value is calculated as follows according to the Fikentscher formula (H. Fikentscher, Die Messung der Viskositat solvatisierter Sole Morden Plastics [J], 1945, 23 (3): 157):

$$K = \frac{\sqrt{300clg\eta_r + (c + 1.5clg\eta_r)^2} + 1.5clg\eta_r - c}{0.15c + 0.003c^2}$$

Wherein:
K is the Fikentscher constant;

C is the mass of the sample used (based on the anhydrous substance)), g;

$\eta_r$ is the relative viscosity (the ratio $T/T_0$ of the flow time of the solution and the flow time of the pure solvent).

1.4.2 Residual Monomer Content a. Iodometry

The measurement of the residual monomer content of homopolymerized N-vinyl butyrolactam refers to the method regulated in the United States Pharmacopoeia, 26th ed. 10 g homopolymerized N-vinyl butyrolactam (accurate to 0.002 g, based on the anhydrous substance) is weighted and dissolved in 80 ml distilled water, 1 g sodium acetate is added, and the solution is titrated with 0.1 mol/L iodine solution until the solution is no longer faded, then 3 ml of 0.1 mol/L iodine solution is added additionally, then the solution is placed for 10 minutes, then excess iodine is titrated with 0.1 mol/L sodium thiosulfate, when it is near the end point of the titration, 3 ml of a starch indicator is added, and the titration continues till the color of the solution disappears, compared with the blank experiment.

The result is calculated as follows:

$$w\ (\%) = \frac{(V_1 - V_2) \times c \times 0.106}{m} \times 100$$

Wherein:
$V_1$—the iodine solution (mL) consumed in titrating the blank sample $V_2$—the standard iodine solution (mL) consumed in titrating the sample c—the concentration (mol/L) of the standard iodine solution 0.106—the mass (g) of 1 mmol/L N-vinyl butyrolactam (NVP)

m—the mass (g) of the sample b. HPLC—High Performance Liquid Chromatography (Omitted).

2.1 Effects of Different Initiation Systems

The present experiment mainly studies the solution polymerization, in which various initiators are used for polymerization, therefore a variety of initiation systems are used, for example, peroxide systems, such as: hydrogen peroxide ($H_2O_2$), tert-butyl hydroperoxide, benzoyl peroxide; redox systems, such as: ammonium persulfate-sodium bisulfite; azo systems, such as: azobisisobutyronitrile, azobisisoheptonitrile.

TABLE 2

Effects of different initiation systems on the experimental result

| No. | initiator | residual monomer content | K value |
|---|---|---|---|
| 1 | hydrogen peroxide | 0.11% | 23 |
| 2 | tert-butyl hydroperoxide | 0.01% | 18 |
| 3 | hydrogen peroxide + tert-butyl hydroperoxide | 0.01% | 12 |
| 4 | ammonium persulfate + sodium bisulphite | 0.03% | 38 |
| 5 | azobisisobutyronitrile | 0.02% | 35 |
| 6 | azobisisobutyronitrile + hydrogen peroxide | 0.02% | 29 |

From the data of the above table, it can be seen that: compared with other initiation systems, the residual monomer content of the homopolymerized N-vinyl butyrolactam synthesized with an inorganic peroxide type initiator such as hydrogen peroxide is relatively high, this is mainly because when a peroxide type initiator is used, the cleavage of the pyrrolidone ring occurs in the chain termination in the polymerization mechanism, making the second end group of the homopolymerized N-vinyl butyrolactam be an aldehyde group, a part of the pyrrolidone will be remained in the product, causing the residual monomer content of the product to be relatively high; when the homopolymerized N-vinyl butyrolactam is synthesized with an initiator of a redox system or an azo initiator, the initiation system decomposes more free radicals in the entire polymerization process, resulting in that the reaction rate is relatively fast and the polymerization is difficult to control; when hydrogen peroxide and tert-butyl hydroperoxide are used in combination, we find that the residual monomer content of the homopolymerized N-vinyl butyrolactam synthesized is relatively low, the molecular weight is 2000-15000, the K value is 12-17 and meets related requirements.

2.2 Effects of Amounts of an Initiator Used

Take the aqueous solution polymerization for example, whatever initiator is used, the K values of the homopolymerized N-vinyl butyrolactams synthesized with different amounts of the initiator are also different. Under the present experimental condition, the effects of changing the amount of the initiator on the result are shown in the following Table 3:

TABLE 3

Effects of the amounts of the initiator on the K value of the product

| No. | used amount of initiator (based on NVP) | K value |
|---|---|---|
| 1 | 0.12% | 65 |
| 2 | 0.18% | 54 |
| 3 | 0.24% | 48 |
| 4 | 0.50% | 38 |
| 5 | 1.00% | 33 |
| 6 | 1.50% | 22 |
| 7 | 2.00% | 13 |

Under the present experimental condition, the K values of the homopolymerized N-vinyl butyrolactam products obtained by increasing the amount of the initiator gradually are decreased gradually. This is mainly because, when the concentration of the initiator in the reaction system is relatively high, the free radicals generated are also increased, which hinders the chain growth reaction, instead increases the chain termination reaction.

2.3 Effects of Activators

Generally, if a reaction is initiated by using an initiator alone, the polymerization rate is relatively slow and the reaction time is relatively long, which is not beneficial to the industrial production requirements. In order to increase the reaction rate, a certain amount of an activator may be appropriately added. Under the present experimental condition, the effects of different activators on the initiation effect of an initiator are shown in Table 4:

TABLE 4

Effects of activators on the result

| No. | activator | used amount of activator (based on N-vinyl butyrolactam) | induction period | K value |
|---|---|---|---|---|
| 1 | none | 0 | Not initiated after 2 h | — |
| 2 | Triethanolamine | 0.65% | 85 | 22 |

TABLE 4-continued

Effects of activators on the result

| No. | activator | used amount of activator (based on N-vinyl butyrolactam) | induction period | K value |
|---|---|---|---|---|
| 3 | Sodium Hydroxide | 0.32% | 65 | 25 |
| 4 | Sodium triethylamine | 0.80% | 65 | 15 |
| 5 | sodium carbonate | 0.95% | 80 | 12 |
| 6 | ammonia water | 0.55% | 35 | 17 |

From the data in the table, it can be seen that, adding a certain amount of an activator during the polymerization process would increase the polymerization rate greatly, while the selection of using a certain amount of an activator also has a certain effect on the molecular weight of the homopolymerized N-vinyl butyrolactam. Combining the effects of the additions of the above several activators on the experimental induction period and the K value, the present experiment preferably selects sodium hydrosulfite as the activator of the initiator.

2.4 Effect of the Peroxide Treatment on the Residual Monomer Content of Homopolymerized N-Vinyl Butyrolactam The residual monomer content of the homopolymerized N-vinyl butyrolactam synthesized with a general method is relatively high, especially the color of the ultra low molecular weight homopolymerized N-vinyl butyrolactam synthesized under the present experimental condition is yellowish. Through experiments, it is found that, adding a small amount of peroxide for treatment in the late period of the reaction, the residual monomer content of the homopolymerized N-vinyl butyrolactam can be greatly decreased, at the time the color change of the homopolymerized N-vinyl butyrolactam product synthesized is relatively small, the APHA of its 10% aqueous solution is below 100.

3 Conclusions

Through the verifications of many experiments, we found that, when the concentration of NVP monomers is 15%~40%, then based on the N-vinyl butyrolactam, 0.5%~5.0% of the initiators, 0.1%~5.0% of the catalyst, and 0.1%~10% of the molecular weight regulator are added, and the pH of the system is adjusted to 7.0-8.0 with a suitable amount of the activator; finally a small amount of peroxide is added for treatment at the late period, so as to obtain a colorless and transparent aqueous solution of ultra low molecular weight homopolymerized N-vinyl butyrolactam, whose molecular weight is 2000-15000, and whose K value is 12-17.

Hereinafter the present invention is further exemplified by reference to the following examples, however the present invention is not limited by the examples. In the following contents, unless otherwise stated, the "part by weight" is only expressed as "part", the "weight %" is only expressed as "%".

Example 1

In a three-necked flask equipped with a reflux condenser and a stirrer, 135 parts of water is added, 36 parts of N-vinyl butyrolactam monomers, 1.5 parts of a mixed solution of hydrogen peroxide and tert-butyl hydroperoxide with the weight ratio of 1:1, 1.7 parts of 0.001% copper sulfate solution and 0.1 parts of dodecyl mercaptan are added while introducing $N_2$ and stirring, the pH of the solution is adjusted to 7.0-8.0 with a diluted ammonia water, the flask is placed into an oil bath at 60° C., 84 parts of N-vinyl butyrolactam monomers, 4.05 parts of tert-butyl hydroperoxide, 0.7 parts of 0.001% copper sulfate solution, 0.02 parts of dodecyl mercaptan and 165 parts of water are added at four times during 4 hours after the beginning of the reaction, the pH of the solution is adjusted to 7.0-8.0 with the diluted ammonia water during this time period, then 0.45 parts of tert-butyl hydroperoxide is added after the temperature is increased to 90° C. and maintained for 30 min, then 1.2 parts of hydrogen peroxide is added after the temperature is maintained for 1 hour, then the temperature is further maintained for 2 hours, a colorless and transparent solution of ultra low molecular weight homopolymerized N-vinyl butyrolactam is obtained by cooling, through the spray drying, a white powdery product is obtained. After the measurements, the K value of the homopolymerized N-vinyl butyrolactam is 12.5, the molecular weight is 2561, and the residual monomer content is 7 ppm.

Example 2

In a three-necked flask equipped with a reflux condenser and a stirrer, 153 parts of water is added, 18 parts of N-vinyl butyrolactam monomers, 0.075 parts of a mixed solution of hydrogen peroxide and tert-butyl hydroperoxide with the weight ratio of 1:1, 0.05 parts of 0.001% copper sulfate solution and 5 parts of isopropanol are added while introducing $N_2$ and stirring, the pH of the solution is adjusted to 7.0-8.0 with a diluted ammonia water, the flask is placed into an oil bath at 75° C., 42 parts of N-vinyl butyrolactam monomers, 0.2025 parts of the mixed solution of hydrogen peroxide and tert-butyl hydroperoxide with the weight ratio of 1:1, 0.01 parts of 0.001% copper sulfate solution, 1 part of isopropanol and 187 parts of water are added at four times during 9 hours after the beginning of the reaction, the pH of the solution is adjusted to 7.0-8.0 with the diluted ammonia water during this time period, then 0.0225 parts of the mixed solution of hydrogen peroxide and tert-butyl hydroperoxide with the weight ratio of 1:1 is added after the temperature is increased to 80° C. and maintained for 30 min, then 0.3 parts of hydrogen peroxide is added after the temperature is maintained for 1.5 hours, then the temperature is further maintained for 2 hours, a yellowish and transparent solution of ultra low molecular weight homopolymerized N-vinyl butyrolactam is obtained by cooling, through the spray drying, a white powdery product is obtained. After the measurements, the K value of the homopolymerized N-vinyl butyrolactam is 17.3, the molecular weight is 9535, and the residual monomer content is 3 ppm.

Example 3

In a three-necked flask equipped with a reflux condenser and a stirrer, 108 parts of water is added, 48 parts of N-vinyl butyrolactam monomers, 0.8 parts of a mixed solution of hydrogen peroxide and tert-butyl hydroperoxide with the weight ratio of 1:1, 5.6 parts of 0.001% copper sulfate solution and 5.6 parts of isopropanol are added while introducing $N_2$ and stirring, the pH of the solution is adjusted to 7.0-8.0 with a diluted ammonia water, the flask is placed into an oil bath at 85° C., 112 parts of N-vinyl butyrolactam monomers, 2.16 parts of the mixed solution of hydrogen peroxide and tert-butyl hydroperoxide with the weight ratio of 1:1, 2.4 parts of 0.001% copper sulfate solution, 2.4 parts of isopropanol and 132 parts of water are added at four times during 6 hours after the beginning of the reaction, the pH of the solution is adjusted to 7.0-8.0 with the diluted ammonia water during this time period, then 0.24 parts of the mixed solution of hydrogen peroxide and tert-butyl hydroperoxide with the weight ratio of 1:1 is added after the temperature is increased to 120° C. and maintained for 30 min, then 0.016 parts of hydrogen peroxide is added after the temperature is maintained for 3 hours, then the temperature is further maintained for 2 hours, a yellowish and transparent solution of ultra low molecular weight homopolymerized N-vinyl butyrolactam is obtained by cooling, through the spray drying, a white powdery product is obtained. After the measurements, the K value of the homopolymerized N-vinyl butyrolactam is 17.3, the molecular weight is 9535, and the residual monomer content is 3 ppm.

Example 4

Except that the last "1.2 parts of hydrogen peroxide" before the completion of the reaction is substituted with "1.2 parts of tert-butyl hydroperoxide", the same procedure as Example 1 is carried out, to obtain a yellowish and transparent aqueous solution of homopolymerized N-vinyl butyrolactam, through the spray drying, a powdery product is obtained. After the measurements, the K value of the homopolymerized N-vinyl butyrolactam is 13.1, the molecular weight is 2583, and the residual monomer content is 4 ppm.

Example 5

Except that "5.6 parts of isopropanol" is substituted with "10 parts of isopropanol", "0.8 parts of a mixed solution of hydrogen peroxide and tert-butyl hydroperoxide with the weight ratio of 1:1" is substituted with "4.0 parts of a mixed solution of hydrogen peroxide and tert-butyl hydroperoxide with the weight ratio of 1:1", the same procedure as Example 3 is carried out, to obtain a colorless and transparent aqueous solution of homopolymerized N-vinyl butyrolactam, through the spray drying, a powdery product is obtained. After the measurements, the K value of the homopolymerized N-vinyl butyrolactam is 15.5, the molecular weight is 6983, and the residual monomer content is 2 ppm.

Comparative Example 1

Except that the addition of the last "1.2 parts of hydrogen peroxide" before the completion of the reaction is canceled, the same procedure as Example 1 is carried out, to obtain a yellowish and transparent aqueous solution of homopolymerized N-vinyl butyrolactam, through the spray drying, a powdery product is obtained. After the measurements, the K value of the homopolymerized N-vinyl butyrolactam is 19.2, the molecular weight is 12800, and the residual monomer content is 147 ppm.

Comparative Example 2

Except that "a mixed solution of hydrogen peroxide and tert-butyl hydroperoxide with the weight ratio of 1:1" in the reaction is substituted with "hydrogen peroxide", the same procedure as Example 1 is carried out, to obtain a yellowish and transparent aqueous solution of homopolymerized N-vinyl butyrolactam, through the spray drying, a powdery product is obtained. After the measurements, the K value of the homopolymerized N-vinyl butyrolactam is 27.8, the molecular weight is 38150, and the residual monomer content is 115 ppm.

Comparative Example 3

Except that "a mixed solution of hydrogen peroxide and tert-butyl hydroperoxide with the weight ratio of 1:1" in the reaction is substituted with "benzoyl peroxide", the same procedure as Example 2 is carried out, to obtain a yellowish and transparent aqueous solution of homopolymerized N-vinyl butyrolactam, through the spray drying, a powdery product is obtained. After the measurements, the K value of the homopolymerized N-vinyl butyrolactam is 22.0, the molecular weight is 23050, and the residual monomer content is 214 ppm.

Comparative Example 4

Except that "a mixed solution of hydrogen peroxide and tert-butyl hydroperoxide with the weight ratio of 1:1" in the reaction is substituted with "azobisisoheptonitrile", the same procedure as Example 2 is carried out, to obtain a yellow and transparent aqueous solution of homopolymerized N-vinyl butyrolactam, through the spray drying, a powdery product is obtained. After the measurements, the K value of the homopolymerized N-vinyl butyrolactam is 31.5, the molecular weight is 52050, and the residual monomer content is 235 ppm.

Therefore, the present invention develops a method that can synthesize an ultra low molecular weight homopolymerized N-vinyl butyrolactam with ultra low residual monomer content by studying the effects of initiation systems, amounts of initiators, times, polymerization processes etc. on the final product in the synthesis process of homopolymerized N-vinyl butyrolactam. The homopolymerized N-vinyl butyrolactam product whose molecular weight is 2000-15000, whose K value is 12-17 and whose residual monomer content is below 10 ppm can be synthesized by this method.

To sum up, the synthesis method of ultra low molecular weight homopolymerized N-vinyl butyrolactam with ultra low residual monomer content of the present invention is designed skillfully and simple in preparation, the residual monomer content of the ultra low molecular weight homopolymerized N-vinyl butyrolactam with ultra low residual monomer content prepared is less than 10 ppm, and the K value is 12-17, therefore the present invention is suitable for large-scale popularization.

In the present specification, the present invention has been described according to the particular embodiments. But it is obvious that these embodiments can be modified or changed without departure from the spirit and scope of the present invention. Therefore, the specification described above is exemplary only and not intended to be limiting.

We claim:

1. A synthesis method of ultra low molecular weight homopolymerized N-vinyl butyrolactam with ultra low residual monomer content comprising:

providing N-vinyl butyrolactam monomers and water with the mass ratio of 3:17~8:12, then based on the N-vinyl butyrolactam monomers, providing 0.5%~5.0% by weight of initiators, 0.1%~5.0% by weight of a catalyst, and 0.1%~10% by weight of a molecular weight regulator, wherein the initiators include 25% by weight of the weight of initiators of an initiator A, 67.5% by weight of the weight of initiators of an initiator B and 7.5% by weight of the weight of initiators of an initiator C;

in the presence of an inert gas, first adding 45% of the total weight of the water, 30% of the total weight of the N-vinyl butyrolactam monomers, the initiator A, 70% of the total weight of the catalyst and at least 70% of the total weight of the molecular weight regulator, adjusting the pH of the reaction system to 7.0-8.0 with an activator, reacting at the polymerization temperature of 60-85° C., adding the remaining water, the remaining N-vinyl butyrolactam monomers, the initiator B, the remaining catalyst and the remaining molecular weight regulator in batches during the initial 4-9 hours after the beginning of the reaction, adjusting the pH of the reaction system to 7.0-8.0 with the activator during this period, then adding the initiator C after keeping the temperature of 80-100° C. for 30 minutes, then adding a peroxide with 0.01% ~1% of the total weight of the N-vinyl butyrolactam monomers after keeping the temperature for 1-3 hours, then further keeping the temperature for 2 hours, to obtain an aqueous solution of ultra low molecular weight homopolymerized N-vinyl butyrolactam, drying the aqueous solution to obtain a powdery ultra low molecular weight homopolymerized N-vinyl butyrolactam with ultra low residual monomer content, whose K value is 12-17, whose weight average molecular weight is 2000-15000, and whose residual monomer content is less than 10 ppm.

2. The synthesis method of ultra low molecular weight homopolymerized N-vinyl butyrolactam with ultra low residual monomer content according to claim 1, wherein the initiators are selected from the group consisting of: hydrogen peroxide, tert-butyl hydroperoxide, tert-amyl hydroperoxide, peroxydisulfuric, and potassium peroxydisulfate.

3. The synthesis method of ultra low molecular weight homopolymerized N-vinyl butyrolactam with ultra low residual monomer content according to claim 2, wherein the initiator A is a solution mixing hydrogen peroxide and tert-butyl hydroperoxide; the initiator B is tert-butyl hydroperoxide or a solution mixing hydrogen peroxide and tert-butyl hydroperoxide; the initiator C is tert-butyl hydroperoxide or a solution mixing hydrogen peroxide and tert-butyl hydroperoxide.

4. The synthesis method of ultra low molecular weight homopolymerized N-vinyl butyrolactam with ultra low residual monomer content according to claim 1, wherein the catalyst is selected from at least one of ferrous sulfate aqueous solution, ferrous chloride aqueous solution and copper sulfate aqueous solution.

5. The synthesis method of ultra low molecular weight homopolymerized N-vinyl butyrolactam with ultra low residual monomer content according to claim 1, wherein the molecular weight regulator is selected from at last one of ethanol, n-propanol, isopropanol, dodecyl mercaptan and sulfite.

6. The synthesis method of ultra low molecular weight homopolymerized N-vinyl butyrolactam with ultra low residual monomer content according to claim 1, wherein the activator is ammonia water, sodium hydroxide, triethanolamine, hydroxyl ammonium salt or sodium carbonate.

7. The synthesis method of ultra low molecular weight homopolymerized N-vinyl butyrolactam with ultra low residual monomer content according to claim 1, wherein the peroxide is hydrogen peroxide or tert-butyl hydroperoxide.

* * * * *